US011799140B2

United States Patent
Sharma et al.

(10) Patent No.: US 11,799,140 B2
(45) Date of Patent: Oct. 24, 2023

(54) CONTROLLER FOR ENERGY STORAGE, SYSTEM COMPRISING THE SAME, AND METHODS OF USING THE SAME

(71) Applicants: China Energy Investment Corporation Limited, Beijing (CN); National Institute of Clean-and-Low-Carbon Energy, Beijing (CN)

(72) Inventors: Ratnesh Sharma, Fremont, CA (US); Surinder Singh, Fremont, CA (US); Peng Yu, Fremont, CA (US); You Zhou, Beijing (CN); Lulu Zhao, Beijing (CN); Brandon Ohara, Mountain View, CA (US)

(73) Assignees: China Energy Investment Corporation Limited, Beijing (CN); National Institute of Clean-and-Low-Carbon Energy, Beijing (CN)

( * ) Notice: Subject to any disclaimer, the term of this patent is extended or adjusted under 35 U.S.C. 154(b) by 211 days.

(21) Appl. No.: 17/201,529

(22) Filed: Mar. 15, 2021

(65) Prior Publication Data

US 2022/0294036 A1 Sep. 15, 2022

(51) Int. Cl.
*H01M 10/44* (2006.01)
*H02J 7/00* (2006.01)
*H02J 7/02* (2016.01)

(52) U.S. Cl.
CPC ........... *H01M 10/441* (2013.01); *H02J 7/005* (2020.01); *H02J 7/0048* (2020.01); *H02J 7/02* (2013.01)

(58) Field of Classification Search
CPC ...... H01M 10/441; H02J 7/0048; H02J 7/005; H02J 7/02
See application file for complete search history.

(56) References Cited

U.S. PATENT DOCUMENTS

| 4,902,956 A | * | 2/1990 | Sloan | H02J 7/0029 320/135 |
| 10,855,081 B2 | | 12/2020 | Wenzel et al. | |

(Continued)

FOREIGN PATENT DOCUMENTS

| CN | 107121643 B | 9/2017 |
| CN | 109818365 A | 5/2019 |
| CN | 110518667 A | 11/2019 |

OTHER PUBLICATIONS

Castillo et al. "Calculation of the state of safety (SOS) for lithium ion batteries", Journal of Power Sources, vol. 324, 2016, pp. 509-520, ISSN 0378-7753, https://doi.org/10.1016/j.jpowsour.2016.05.068. (Year: 2016).*

(Continued)

*Primary Examiner* — Drew A Dunn
*Assistant Examiner* — Pamela J Jeppson
(74) *Attorney, Agent, or Firm* — Calfee, Halter & Griswold LLP

(57) ABSTRACT

An electrical energy storage system, a controller, and methods of using the same are provided. The system includes battery packs connected in parallel, one or more battery power management unit, one or more power converters, and a controller. The controller includes one or more processor and at least one tangible, non-transitory machine readable medium encoded with one or more programs configured to perform steps for discharging or charging. The steps include: reading data including state of health (SOH) and state of charge (SOC) from each battery pack, connecting a respective battery pack with a respective power converter; receiving a power command from an energy management system, calculating a respective power rate of each battery pack based on the data of SOH, SOC, and the power command, and discharging power from battery packs to a grid or (Continued)

charging power to battery packs based on the power rate of each battery pack.

17 Claims, 10 Drawing Sheets

(56) References Cited

U.S. PATENT DOCUMENTS

| | | | |
|---|---|---|---|
| 2010/0297482 A1* | 11/2010 | Yoon | H01M 10/0413 429/61 |
| 2016/0226268 A1 | 8/2016 | Okui | |
| 2021/0050729 A1 | 2/2021 | Arvind et al. | |

OTHER PUBLICATIONS

European Search Report from European Application No. 22158913.8 dated Aug. 4, 2022 (9 pages).

\* cited by examiner

CONTROLLER FOR ENERGY STORAGE, SYSTEM COMPRISING THE SAME, AND METHODS OF USING THE SAME

PRIORITY CLAIM AND CROSS-REFERENCE

None.

FIELD OF THE INVENTION

The disclosure relates to systems and methods for energy storage generally. More particularly, the disclosed subject matter relates to a controller for a stationary energy storage, a system comprising the same, and a method for controlling stationary energy storage.

BACKGROUND

Clean and renewable sources of energy become more important due to increased concerns about environmental issues such as global warming. Such sources include solar and wind power, and rechargeable battery. Renewable energy sources are not flexible because they cannot be dispatched when needed to meet the changing requirements of energy consumers. Energy storage systems are expected to solve this flexibility challenge. A stationary energy storage system can store energy and release energy in the form of electricity when it is needed.

SUMMARY OF THE INVENTION

The present disclosure provides a controller for an electrical energy storage system, an electrical energy storage system comprising such a controller, and methods of using the same. The system may be called as a distributed power energy storage system (DPESS). The controller uses multi-source inputs smart technology (MIST), and may be called a MIST controller.

In accordance with some embodiments, an electrical energy storage system comprises a plurality of battery packs connected in parallel, one or more battery power management unit (BPMU), one or more power converters, and a controller. Each BPMU is connected with one or more battery packs, and is configured to monitor and control the one or more battery packs or a respective battery pack. Each power converter or called a power conversion system (PCS) device is coupled with at least one battery pack and is configured to convert direct current (DC) from a respective battery pack to alternating current (AC) or vice versa.

The controller uses multi-source inputs smart technology (MIST), and comprises one or more processor and at least one tangible, non-transitory machine readable medium encoded with one or more programs configured to perform steps for discharging or charging. In some embodiments, these steps may include: reading data including state of health (SOH) and state of charge (SOC) from each battery pack, connecting a respective battery pack with a respective power converter, receiving a power command from an upper level energy management system (EMS), calculating a respective power rate of each battery pack based on the SOH and the SOC of each battery pack and the power command from the EMS, and discharging power from or charging power to the plurality of battery packs based on the power rate of each battery pack.

In some embodiments, the plurality of battery packs are heterogeneous battery packs selected from new batteries, second-use electric vehicle (EV) batteries, or combinations thereof. The used EV batteries can be directly utilized in the system, without pre-selection or dismantling. Each battery pack comprises an inverter and an internal battery management unit (BMU) in the pack.

In some embodiments, the controller is configured to read the data from and monitor the inverter and the BMU of each battery pack. This may be done through each respective BPMU connected with each battery pack.

In some embodiments, the system further comprises a plurality automatic circuit breakers. Each circuit breaker may be disposed between a battery pack and a respective power converter, and is configured to connect or disconnect a respective battery pack and a respective power converter.

The controller is configured to discharge power from the plurality of battery packs in direct current to a grid in alternating current, or charge power from the grid to the plurality of battery packs.

In some embodiments, the controller is configured to calculate a respective power rate ($P_i$) of each battery pack according to equations (1) and (2):

$$a_i = 100\% * \begin{cases} \dfrac{SOH_i(1-SOC_i)}{\Sigma_i SOH_i(1-SOC_i)}, \text{Charge} \\ \dfrac{SOH_i * SOC_i}{\Sigma_i SOH_i * SOC_i}, \text{Discharge} \end{cases} \text{and,} \quad (1)$$

$$P_i = \min(P_{iMax}, P_T * a_i), \quad (2)$$

wherein $SOH_i$ and $SOC_i$ are the SOH and the SOC of each battery pack, respectively, $P_T$ is the power command from the EMS, $P_{iMax}$ is the maximum capacity of each battery pack, and $a_i$ is a multiplier (in percentage) representing a dispatch share of each battery pack. The subscript "i" represents the number of each respective battery pack in the plurality of battery packs. The respective power rate ($P_i$) of each battery pack is the minimum (or the smaller value) of the two values including $P_{iMax}$ and $P_T * a_i$.

In some embodiments, the controller is configured to send signals with instruction to each converter and/or each battery pack for discharging or charging based on the respective power rate of each battery pack. Alternatively, the controller is configured to send feedback to the EMS if the power command is over a maximum limit of the system.

In another aspect, the present disclosure provides a controller for an electrical energy storage system. The controller uses multi-source inputs smart technology (MIST) and comprises one or more processor and at least one tangible, non-transitory machine readable medium encoded with one or more programs configured to perform steps for discharging or charging. In some embodiments, these steps include: reading data including state of health (SOH) and state of charge (SOC) from each of the plurality of battery packs connected in parallel, and connecting a respective battery pack with a respective power converter. The step of reading SOH and SOC data may be performed through one or more battery power management unit (BPMU), which may be used to monitor and control respective packs of the plurality of battery packs. The power converter is coupled with at least one battery pack and configured to convert direct current (DC) from a respective battery pack to alternating current (AC) or vice versa. The plurality of battery packs are heterogeneous battery packs selected from new batteries, second-use electric vehicle (EV) batteries, or combinations thereof.

The controller is configured to further perform steps of receiving a power command from an upper level energy management system (EMS), calculating a respective power rate of each battery pack based on the SOH and the SOC of each battery pack and the power command from the EMS, and discharging power from or charging power to the plurality of battery packs based on the power rate of each battery pack.

In some embodiments, the controller is configured to calculate a respective power rate ($P_i$) of each battery pack according to equations (1) and (2) described above. In the equation (1), $SOH_i$ and $SOC_i$ are the SOH and the SOC of each battery pack, respectively. The subscript "i" represents the number of each respective battery pack in the plurality of battery packs. $P_T$ is the power command from the EMS, $P_{iMax}$ is the maximum capacity of each battery pack, and $a_i$ is a multiplier representing a dispatch share of each battery pack. The respective power rate ($P_i$) of each battery pack is the minimum (or the smaller value) of the two values including $P_{iMax}$ and $P_T*a_i$.

The controller is configured to discharge power from the plurality of battery packs to a grid, or charge power from the grid to the plurality of battery packs. In some embodiments, the controller is configured to send signals with instruction to each converter and/or each battery pack for discharging or charging based on the respective power rate of each battery pack. The controller is also configured to send feedback to the EMS if the power command is over a maximum limit of the system.

In another aspect, the present disclosure provides a method for operating an electrical energy storage system as described through a controller therein, or a method of using the controller as described. Such a method comprises the steps described herein. The data including state of health (SOH) and state of charge (SOC) is obtained and read from each of the plurality of battery packs, which are connected in parallel. In some embodiments, the controller can be used to read these data directly from battery packs or through one or more battery power management unit (BPMU) for monitoring and controlling the plurality of battery packs.

In some embodiments, the method further comprises steps of connecting a respective battery pack with a respective power converter, receiving a power command from an upper level energy management system (EMS), calculating a respective power rate of each battery pack based on the SOH and the SOC of each battery pack and the power command from the EMS, and discharging power from the plurality of battery packs to a grid or charging power from the grid to the plurality of battery packs based on the power rate of each battery pack. Each power converter is coupled with at least one battery pack and can convert direct current (DC) from a respective battery pack to alternating current (AC) during a discharging process, or vice versa during a charging process. The plurality of battery packs are heterogeneous battery packs selected from new batteries, second-use electric vehicle (EV) batteries, or combinations thereof. The plurality of battery packs are second-use electric vehicle (EV) batteries in some embodiments.

In some embodiments, in the controller, a respective power rate ($P_i$) of each battery pack is calculated according to equations (1) and (2) described above. In the equation (1), $SOH_i$ and $SOC_i$ are the SOH and the SOC of each battery pack, respectively. The subscript "i" represents the number of each respective battery pack in the plurality of battery packs. $P_T$ is the power command from the EMS, $P_{iMax}$ is the maximum capacity of each battery pack, and $a_1$ is a multiplier representing a dispatch share of each battery pack. The respective power rate ($P_i$) of each battery pack is the minimum (or the smaller value) of the two values including $P_{iMax}$ and $P_T*a_i$.

In some embodiments, the method further comprises sending instructions from the controller to each converter and/or each battery pack for discharging or charging based on the respective power rate of each battery pack, or sending feedback from the controller to the EMS if the power command is over a maximum limit of the system.

The system, the controller, and the method provided in the present disclosure offer many advantages. For example, the system is a decentralized design. A variety of new battery packs and used EV battery packs having different quality can be used. No pre-selection or dismantle of the battery packs are needed. If one pack and/or one converter fails to response, the system still has capability to supply power load to satisfy the power demand. The system, the controller, and the method extend the life of each battery packs, and they also offer flexibility in maintaining and upgrading the system as well.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

DETAILED DESCRIPTION

Figure 1:
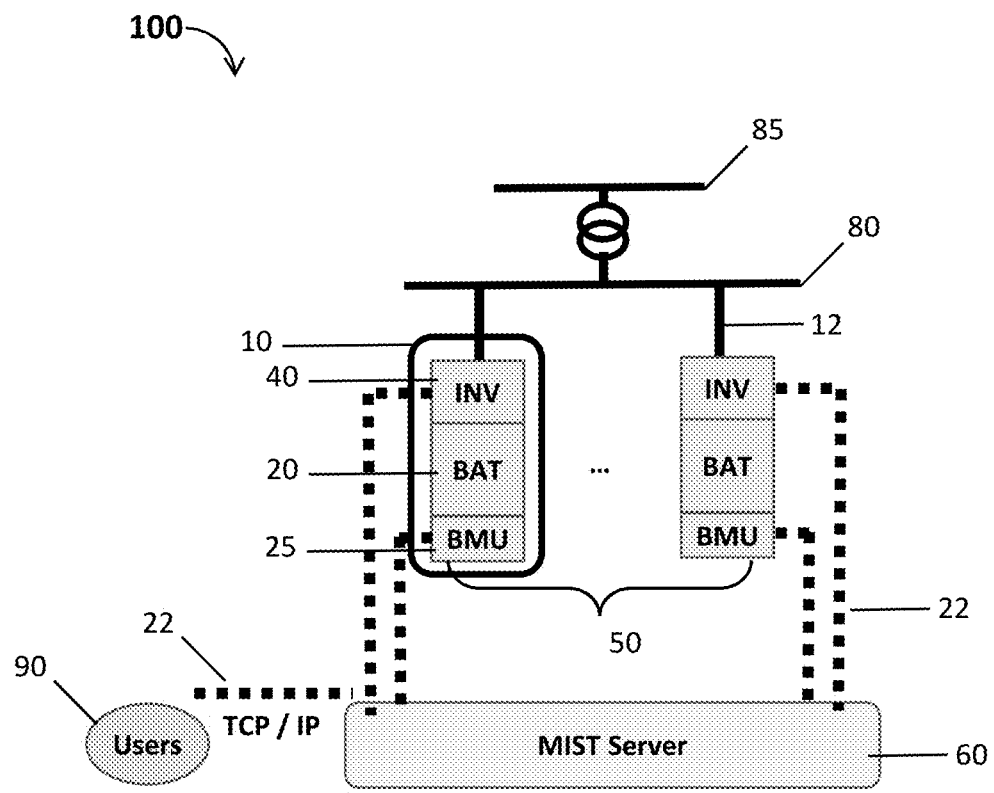
FIG. 1 is a block diagram illustrating an exemplary system, which is a distributed power energy storage system (DPESS) comprising a multi-source inputs smart technology (MIST) controller, in accordance with some embodiments.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

Chinese Patent Application No. CN110518667A discloses an echelon utilizing battery parallel system and its control method, including battery module and DC/DC power converter module. Such a battery module includes a supplying cell module and a battery management module. The supplying cell module includes multiple groups battery pack parallel with one another, and every group of battery pack in parallel is composed of by several battery packs in series, respectively. The battery packs are connected in series to provide a similar voltage in a respective group of battery packs connected in parallel. The battery management module is used to monitor the charge or discharge situation of supplying cell module. The terminal control module judges the operating mode of the battery parallel system according to the data for receiving battery management module transmission, and sends charge or discharge instruction to the DC/DC power converter module. The DC/DC power converter module carries out charge or discharge operation to each batteries in parallel connection group according to the control instruction of the terminal control module.

The system disclosed in CN110518667A utilizes DC/DC converters and battery management module to control a battery system including multiple parallel groups of battery packs connected in series. Such a system ignored the variety of used batteries and existing circulating currents among the series packs. The system and method do not provide detailed control methodology in the coordination between DC/DC converters.

CN110518667A does not disclose whether the system is suitable for connection with a power grid, and the technique disclosed limits the expansion of such a system into a power grid. A DC-to-DC converter is an electronic circuit or electromechanical device that converts a source of direct current (DC) from one voltage level to another. Additional AC/DC converters are still required if a battery system is connected to a power grid. Adding more DC/DC converters will significantly raise the total DC current and increase hardware requirement on the AC/DC converters if the system such as that disclosed in CN110518667A is connected to a power grid.

The present disclosure provides a controller for an electrical energy storage system, an electrical energy storage system comprising such a controller, and methods of using the same. The system may be called as a distributed power energy storage system (DPESS). The controller uses multi-source inputs smart technology (MIST), and may be called a MIST controller.

In accordance with some embodiments, the present disclosure provides a system and a method to properly utilize batteries such as second use electric vehicle (EV) battery packs in stationary energy storage applications. Every battery pack is operated individually according to its characters, such as state of health (SOH), state of charge (SOC), and the pack terminal voltage. Preselecting packs is not required. No series connection between battery packs eliminates circulating currents and losses. The system directly uses grid tied AC/DC converters with flexibility in size expansion. No additional power conversion system is required for grid tied applications.

In accordance with some embodiments, the present disclosure provides a distributed power energy storage system (DPESS), utilizing second-use (or used) electric vehicle (EV) battery packs, and its multi-source inputs smart technology (MIST) controller. In the system provided in the present disclosure, a MIST controller optimally estimates charge/discharge rates for every battery pack. The DPESS accepts various conditions of second use EV battery packs from a selected brand and/or from other car manufactures.

The main benefit of the invention is to efficiently manage the diversity of battery packs such as new batteries, second use EV battery packs, or combinations thereof in stationary energy storage applications. The utilization rates of stronger (healthier) packs among a multi-pack system can be improved. The length of lives of EV battery packs can be evened and overall life the system can be extended. The reliability, stability, and safety of battery energy storage system (BESS) are improved. No addition labor and costs are involved.

Unless it is expressly stated otherwise, the acronyms are used herein for abbreviation. For example, "DPESS" refers to a distributed power energy storage system (DPESS), "BESS" refers to a battery energy storage system, "BPMU" refers to a battery pack management unit, and "MIST" refers to multi-source inputs smart technology.

The controller, the system, and the method provided in the present disclosure apply to different battery packs, which are heterogeneous battery packs. References to "heterogeneous battery packs" made herein refer to battery packs or modules having different capacity, SOC, and/or SOH, and can be selected from new batteries (e.g., from different manufacturers), second-use electric vehicle (EV) batteries, or combinations thereof. Second-use EV batteries are used for illustration purpose. References to "discharging" from or "charging" to the plurality of battery packs are understood that the plurality of batteries packs collectively discharge or be charged, while it is possible that some battery packs may stay idle (without charging or discharging).

Unless expressly indicated otherwise, references to "MIST" or "multi-source inputs smart technology" made herein refers to a term of cloud, which is internet base computing technology, and can perform calculation locally. This term can be also called as "a master intelligent signal translator (MIST)." Such a technology translates the languages of different sources such as inverter and BMS languages (e.g., CAN, Modbus, DNP3, or any other suitable language). Using such a technology, the controller and different devices or units in the system as described herein can communicate with each other.

Unless expressly indicated otherwise, references to "state of health (SOH)" made herein will be understood to mean a figure of merit of the condition of a battery, a battery cell, or a battery pack compared to its ideal conditions. SOH is characterized in percentage (%). The condition matching the specifications under the ideal conditions is 100%. SOH may decrease over time and use.

Unless expressly indicated otherwise, "state of charge" (SOC) described herein is defined as a level of charge of an electric battery relative to its capacity. The units of SoC are percentage points, 0% means empty, and 100% means full.

The term "human machine interface (HMI)" used herein is understood to refer to user interface (UI) is the space where interactions between humans and machines occur. A human-machine interface (HMI) may involve interfaces between human and machines with physical input hardware such as keyboards, mice, or any other human interaction based on tactile, visual, or auditory senses. Such user interfaces may include other layers such as output hardware such as computer monitors, speakers, and printers.

The term "energy management system (EMS)" used herein refers to a system of computer-aided tools used by operators of electric utility grids to monitor, control, and optimize the performance of the generation or transmission system.

In the present disclosure, the terms "power demand" and "power requirement" are used interchangeably, and the terms "converter" and "inverter" can be used interchangeably. Each battery pack includes an inverter and a battery management unit (BMU) therein. For the convenience of description, the term "power inverter" or "AC/DC power converter" is used to describe the internal component in a battery pack, and the term "power converter" or "power conversion system (PCS)" is used to describe the converter connected with one or more battery packs. The term of "battery management unit (BMU)" or "battery management system (BMS)" is used to describe the internal component in a battery pack, and the term "battery power management unit (BPMU)" is used to describe the battery management unit connected with one or more battery packs.

Unless expressly indicated otherwise, the term "connected" or "coupled" used herein are understood to encompass different connections or coupling between or among the components so as to conduct electricity or transmit signals for communication. Such a connection or coupling can be through wire, wireless, or cloud-based modes.

Figure 6A:
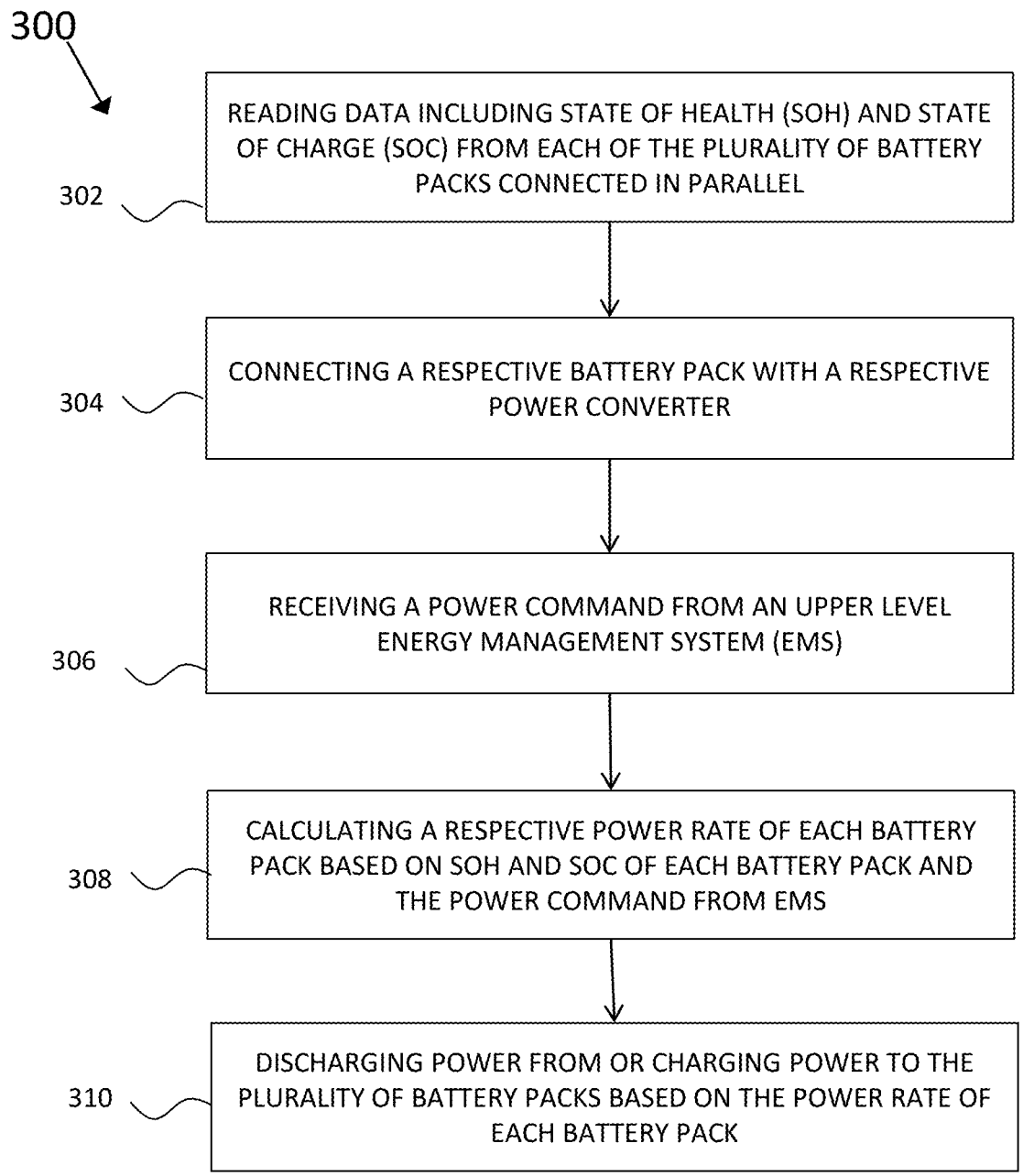
FIGS. 6A-6B are flow charts illustrating an exemplary method for controlling discharge or charge of the battery packs in accordance with some embodiments.
Figure 6B:
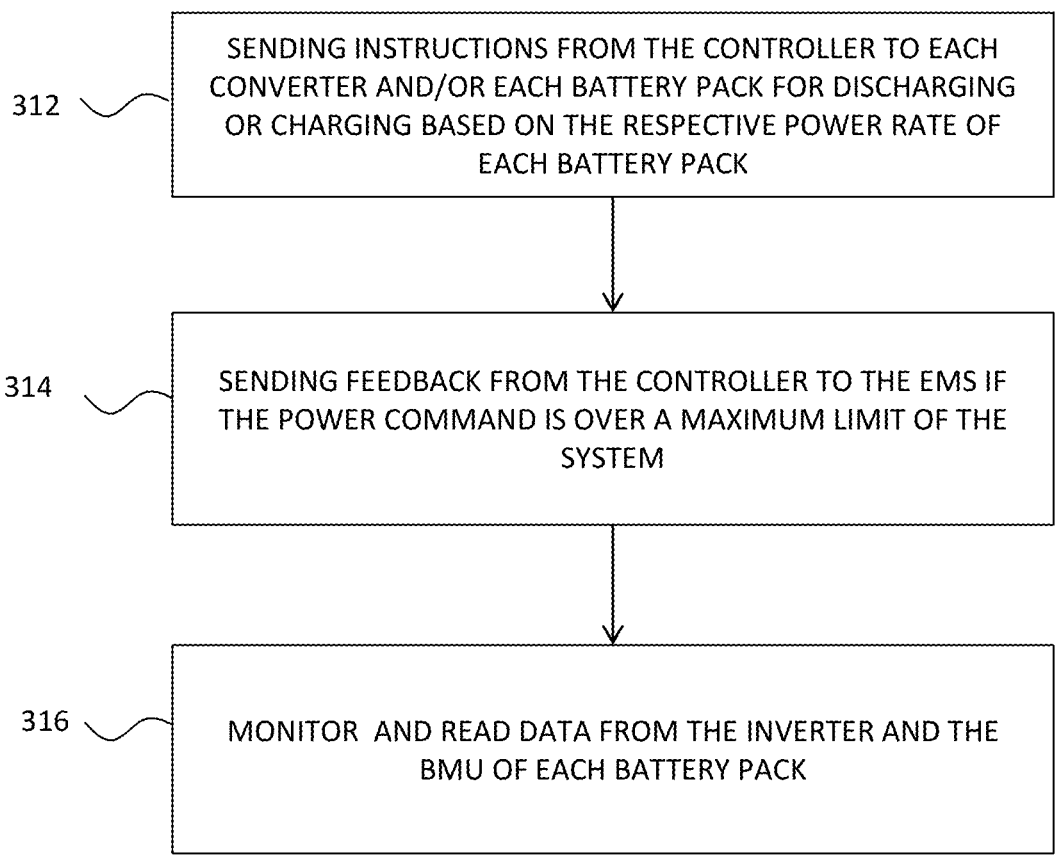
Figure 7:
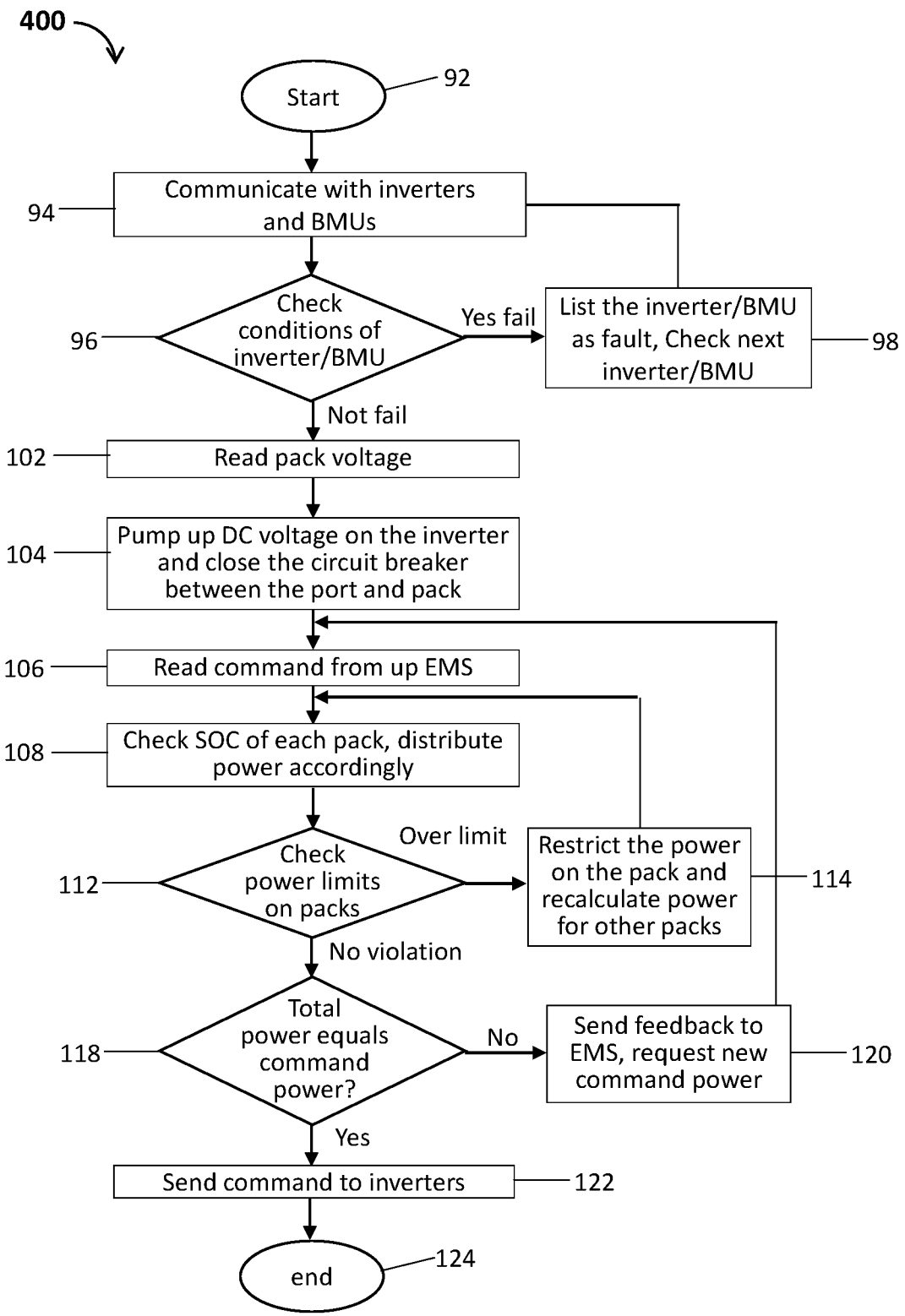
FIG. 7 is a flow chart illustrating an exemplary program for controlling discharge or charge of the battery packs in accordance with some embodiments.

In FIGS. 1-5, like items are indicated by like reference numerals, and for brevity, descriptions of the structure, provided above with reference to the preceding figures, are not repeated. The methods described in FIGS. 6A-6B and 7 are described with reference to the exemplary structure described in FIGS. 1-5.

Figure 2:
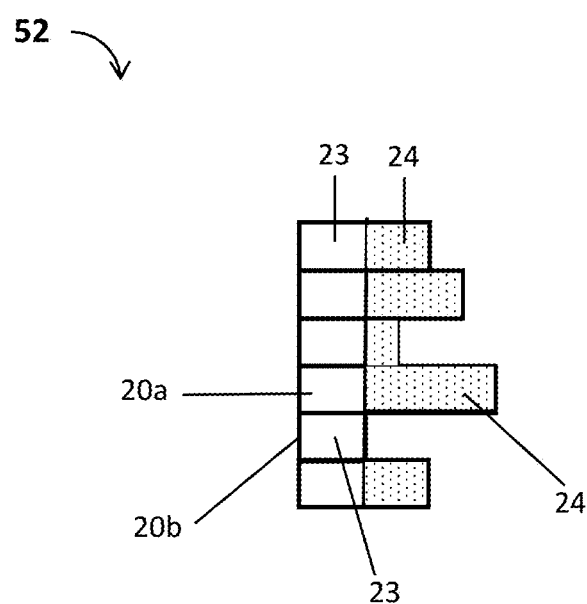
FIG. 2 is a block diagram illustrating a plurality of battery packs used in the exemplary system of FIG. 1.
Figure 3:
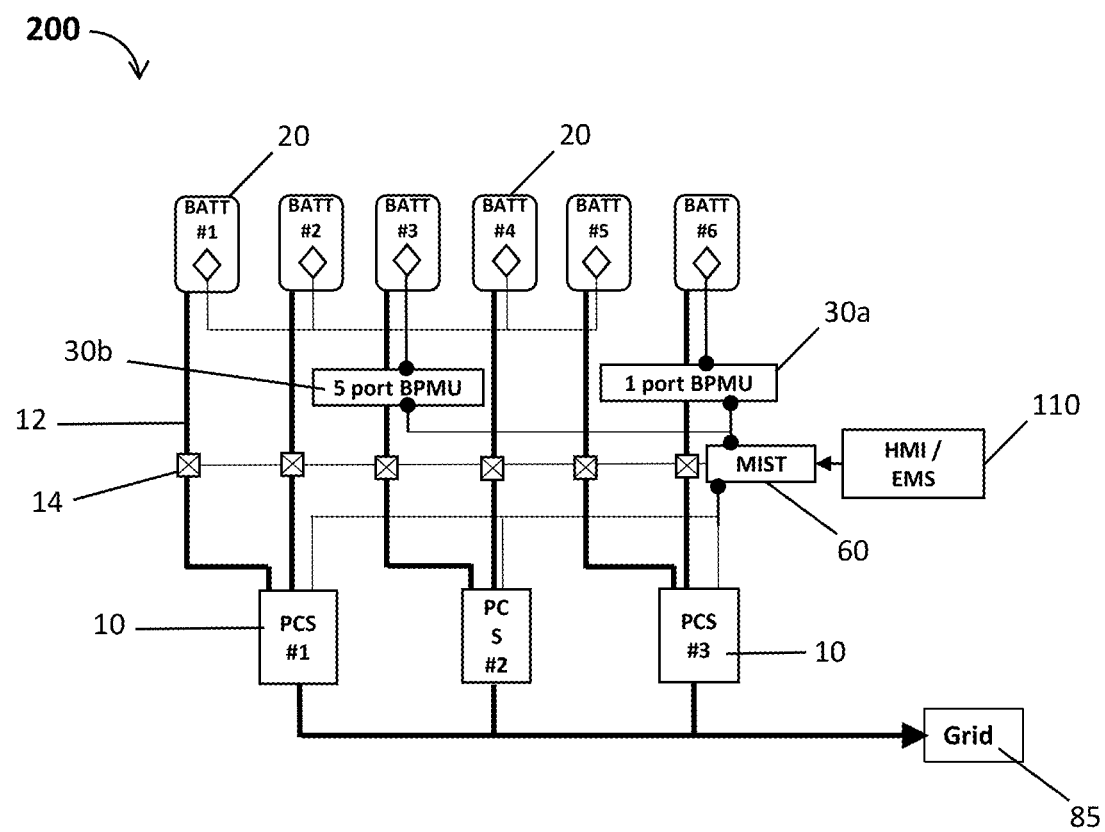
FIG. 3 is a block diagram illustrating an exemplary system according to the design of FIG. 1 and comprising six second-use electric-vehicle (EV) battery packs and three power conversion systems (PCS) in accordance with some embodiments.

Referring to FIG. 1, a framework of an exemplary system 100, which is a distributed power energy storage system (DPESS), is illustrated. FIG. 2 is a block diagram illustrating a plurality of battery packs 20 used in the exemplary system of FIG. 1. FIG. 3 is an example of the system 100 in some embodiments. Such a system 100 comprises a controller 60, which is a multi-source inputs smart technology (MIST) controller in accordance with some embodiments. In the decentralized design, more energy can be utilized in the battery packs.

Referring to FIGS. 1-3, in accordance with some embodiments, the electrical energy storage system 100 comprises a plurality of battery packs 20, one or more battery power management unit (BPMU) 30, and a controller 60. System 100 further comprises power converters 10, which is also called a power conversion system (PCS). The controller 60, labeled as "MIST server" in FIG. 1, may be connected with other components in wire or wireless mode. The dotted lines 22 in FIG. 1 illustrate that the controller 60 can work in a cloud-based mode, and can work as a real-time local cloud. System 100 can be used for discharging power from battery packs 20 to a grid 85, or for charging from the grid 85 to battery packs 20. Wire connection 12 may be used. A busbar 80 may exist between the system 100 and the grid 85.

The plurality of battery packs 20 are connected in a parallel configuration 50. In some embodiments, the plurality of battery packs 20 are second-use (i.e. used) electric vehicle (EV) batteries. The used EV batteries can be directly utilized in the system, without pre-selection or dismantling. As illustrated in FIG. 1, each battery pack 20 comprises a battery or batteries, an internal battery management unit (BMU) 25, and an inverter 40. EV battery packs 20 are removed from vehicles and are not disassembled into modules. Simple tests may be done on these EV battery packs 20 to verify their SOH.

Using the system and the method provided in the present disclosure, energy stored in EV battery packs can be properly cycled by their own rate to avoid uneven performance on packs.

Referring to FIG. 2, six battery packs 20 are illustrated. The length of bar in FIG. 2 illustrates the health or capacity of each battery packs. The better packs (e.g., pack 20a), which have more remaining capacity, can be cycled further when week packs (e.g., pack 20b) are already full/empty. So the usable energy is limited by the weakest pack (e.g., pack 20b). The capacity 23 of the weakest pack is a baseline. The additional power capacity 24 above the baseline is the gained energy in system 100 for discharging. In the earlier stage, the system 100 will utilize more on better packs and make them towards same condition as the weaker packs. The system 100 will be operated at the same condition for all the packs. The total life of the system can be extended.

Referring to FIG. 3, the exemplary system 200, which is an example of system 100 for the illustration purpose only, includes six battery packs 20 connected in parallel. Each BPMU 30 is connected with at least one battery pack 20 and is configured to monitor and control respective battery pack(s) 20. As illustrated in FIG. 3, BPMU 30a is connected with one battery pack 20 at one port, and BPMU 30b having at least five ports is connected with five battery packs 20. The configuration in FIG. 3 is for illustration only. Each BPMU 30 can be connected with any suitable number of battery packs 20. Such suitable number can be 2, 3, 4, 4, 6, or any other suitable integers. The BPMUs 30 are developed according to the brand of EV battery packs in some embodiments.

Each power converter 10 is coupled with at least one battery pack 20 and is configured to convert direct current (DC) from a respective battery pack 20 to alternating current (AC) or vice versa. As illustrated in FIG. 3, three power converters 10 including (PCS No. 1-3) are used. Each of them are connected with two battery packs 20. The configuration in FIG. 3 is for illustration only. Each power converter 10 can be connected with any suitable number of battery packs 10. Such suitable number can be 2, 3, 4, 4, 6, or any other suitable integers.

In some embodiments, the system 100 further comprises a plurality automatic circuit breakers 14. One or two circuit breakers 14 may be disposed between a battery pack 20 and a respective power converter 10, and is configured to connect or disconnect a respective battery pack 20 and a respective power converter 10.

FIG. 3 shows an exemplary system having second-use EV battery packs 20 and their associated circuit breakers 14, two types of BPMU 30 including one for controlling five battery packs 20 and the other connecting with one battery pack, three power converters 10, and one MIST controller 60. The controller 60 may be connected by wire or in wireless or cloud-based mode. In FIG. 3, all the connections between the controller 60 and other components can be wireless and clouded based. The connections among other components can be by wires in some embodiments.

Referring to FIG. 3, each EV battery pack 20 is connected to a single power converter 10 (or independent DC port on a converter 10) through a set of automatic DC circuit breakers 14. The converter 10 (or the DC port) controls whether or not to charge or discharge the single EV battery pack 20. The MIST controller 60 is configured to adjust charge/discharge rates depending on the conditions of EV battery packs such as SOC, SOH, voltage, and temperature.

The controller 60 also controls safety of the system by controlling circuit breakers 14 between power converters 10 and battery packs 20. A circuit breaker 14 will protect a respective EV battery pack 20 from inrush current and arcs while starting the system as well as. The controller 60 collects data of battery packs 20 and pre-charge the DC ports on the converters 10, then close the circuit breakers 14 via function relays and switching motors on the circuit breakers.

Figure 4:
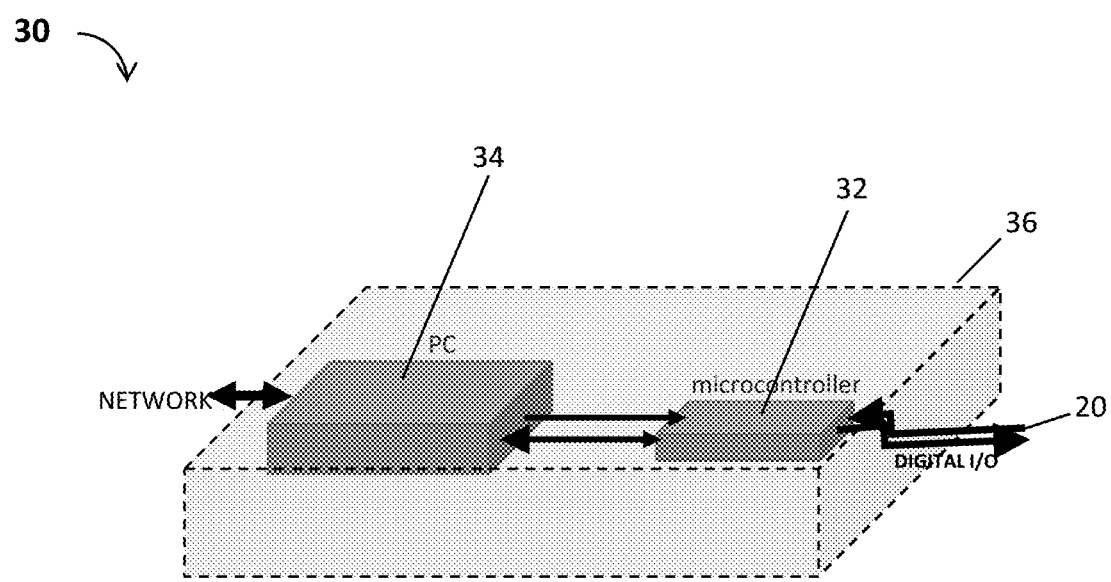
FIG. 4 illustrates an exemplary battery pack management units (BPMU) in accordance with some embodiments.

Referring to FIG. 4, an exemplary battery pack management units (BPMU) 30 is illustrated. The exemplary BPMU 30 comprises a microcontroller 32 and a processor 34 such as a personal computer inside an enclosure 36. The microcontroller 32 connects with and communicates with a respective battery pack 20 with a digital I/O interface. Through the microcontroller 32, the BPMU 30 is configured to monitor and control the respective battery packs 20, by coordinating with the controller 60. The microcontroller 32 and the processor 34 connect and communicate with each other. The processor 34 is connected with the network for the controller 60.

Referring to FIG. 1, in some embodiments, system 100 may be connected directly to 480V 3-phase power grid. All components in the system 100, including HMI, converters, BPMUs, and protection relays, are linked or coupled to the MIST through TCP/IP network. The controller 60 is networked with all components through TCP/IP 22. Users 90 can access the network.

Figure 5:
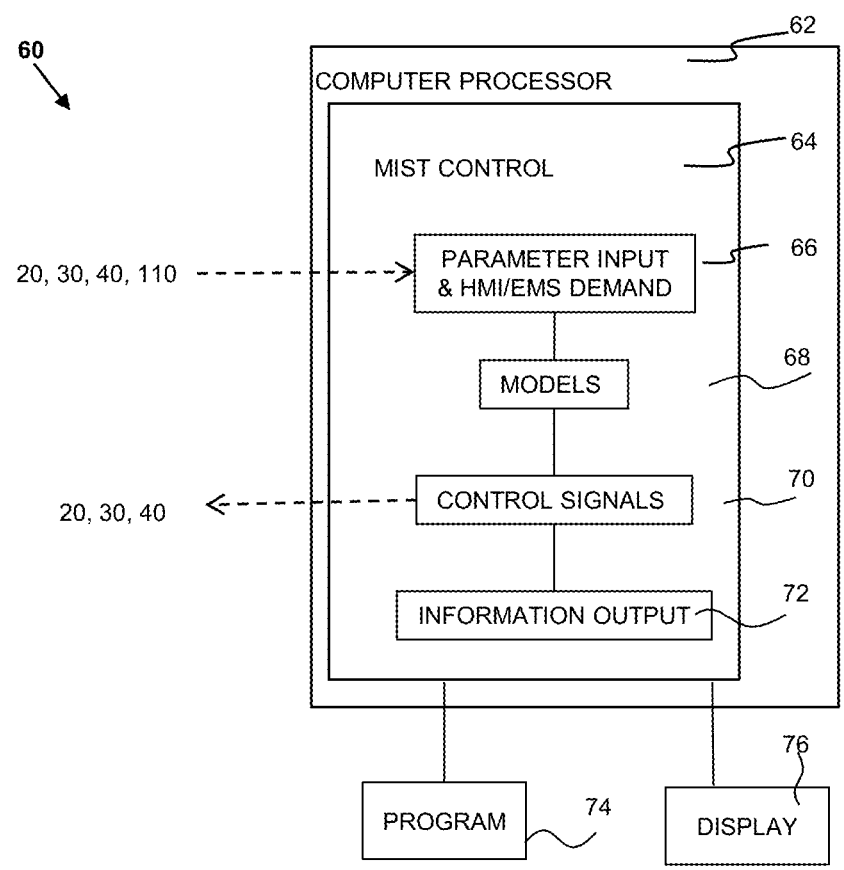
FIG. 5 is a block diagram illustrating an exemplary controller (e.g., a MIST controller) or a computer implemented controller comprising one or more processor and at least one tangible, non-transitory machine readable medium encoded with one or more programs, for controlling discharge or charge of the battery packs in accordance with some embodiments.

Referring to FIGS. 1, 3 and 5, the controller 60 uses multi-source inputs smart technology (MIST) and comprises one or more processor 62 and at least one tangible, non-transitory machine readable medium encoded with one or more programs 74 to be executed by the one or more processors. The processor(s) 62 may include a central MIST control 64, which includes a parameter input module 66, model module 68, a parameter control module 70, and information and instruction module 72. The parameter input module 66 coordinates with the battery packs 20 and HMI or EMS 110 to read the data from battery packs 20 and power demand from HMI or EMS 110. The parameter input module 66 also coordinates with each power converter 10 and BPMU 30. The parameter control module 70 also coordinates with each power converter 10, each battery pack 20, each BPMU 30, and HMI/EMS 110 to control a process of discharging or charging. Together with the one or more programs 74, the model module 68 is configured to perform a simulation based on the input parameters to provide information and instruction to the parameter control module 70 and the information and instruction module 72. The processors 62 may be optionally connected with one or more displays 76 for displaying the information and instructions from module 72 and to an operator.

The controller 60 with the programs 74 and the processor 62 is configured to perform steps for discharging or charging as described herein. In some embodiments, these steps may include: reading data including state of data such as SOH and SOC of each battery pack, connecting a respective battery pack 20 with a respective power converter 10, receiving a power command from an upper level energy management system (EMS) 110, calculating a respective power rate of each battery pack 20 based on the SOH and the SOC of each battery pack 20 and the power command from the EMS 110, and discharging power from or charging power to the plurality of battery packs 20 based on the power rate of each battery pack 20. In some embodiments, the controller 60 is configured to read the data from and monitor the BMU 25 and the inverter 40 and of each battery pack 20. In some embodiments, this may be done through each respective BPMU 30 connected with each battery pack 20.

In accordance with some embodiments, the present disclosure provides a distributed power energy storage system (DPESS) 100, utilizing second-use (or used) electric vehicle (EV) battery packs 20, and its multi-source inputs smart technology (MIST) controller 60. The DPESS comprises a MIST controller 60, one or multiple second-use EV battery packs 20, one or multiple AC/DC battery power conversion systems (PCS) (i.e. power converters 10), one or multiple battery pack management units (BPMU) 30, and multiple automatic circuit breakers 14, as described herein. One single EV battery pack is monitored and controlled by one BPMU 30 or one communication port on a BPMU 30, and it is connected to one single converter 10 (or an independent DC port on the converter 10) through a set of automatic circuit breakers (one for each polarity). One or multiple PCS or converter 10 and battery packs 20 sets are containerized as a DPESS and connected to the power grid 85. The MIST controller 60 collects real time data from the PCSs 10 and BPMUs 30 and estimates power rate for each individual EV battery pack 20. The DPESS in the present disclosure is a decentralized architecture, and all EV battery packs are operated by their own converters. The MIST controller monitors and controls all the components in the system. Disassembling EV battery packs is not required. Circulating currents among battery packs are eliminated. The efficient and life of second use batteries are extended.

In the system provided in the present disclosure, each battery pack 20 is connected with an individual power converter 10 (or called PCS), or an independent DC port on a PCS. One battery pack 20 can be operated as a separate system. A MIST controller 60 is used as a bridge between the decentralized system and upper level energy management system (EMS). The MIST controller has bidirectional communication capacity. The MIST controller 60 collects data from power converters 10 and battery packs 20, summarizes the data, and sends to upper level EMS 110. The MIST controller 60 also receives charge/discharge command and power rates from the EMS 110, calculates proper power rates for individual packs 20, and then sends the action signals to the converter 10 (and the battery inverter 40). The battery packs 20 are utilized according to their state of charge (SOC) and state of health (SOH) values.

Battery packs 20 are connected to their corresponding single converter 10 (or an independent DC port on a converter 10). The converter 10 (or the DC port) is controlled to charge and discharge a single battery pack 20. The MIST controller will adjust charge/discharge rates depending on the conditions of battery packs 20 such as SOC, SOH, voltage, and temperature. Energy stored in battery packs such as EV battery packs can be properly cycled by their own rate to avoid uneven performance on packs. The better (or healthier) packs, which have more remaining capacity, can be cycled further when week packs are already full/empty. In the earlier stage, the DPESS will utilize better packs and make them to degrade towards the same condition as the weaker packs. The system will be operated at the same condition for all the packs. The total life of the system can be extended.

The decentralized system has advantages over a centralized system for energy storage. For example, in a centralized battery energy storage system, multiple battery sets/packs 20 are connected to a power conversion system (PCS). As all batteries are bundled together, the performance of the system is restricted by the weakest battery set. In addition, due to all batteries are connected on the same DC bus, large circulating currents exist. The circulating currents cause self-discharging in battery packs, which reduces the life of batteries.

As one of the benefits of such a decentralized system, if one pack (and/or one converter) fails to response, the system still has capability to supply load. It gives flexibility in maintaining and upgrading the system as well.

Another benefit is to extend life time of battery packs. As illustrated in FIG. 2, the weakest battery pack 20b controls the discharging or charging process in a centralized energy storage system, which must stop charging/discharging when the weakest pack 20b is full/empty. Energy above area 23 cannot be used. Most of packs cannot get fully cycled and life reduces after a short-term operation. Using the decentralized system, the performance of the system is not limited by the weakest pack. Every pack is controlled by its own PCS (or an independent DC port). Energy stored in the packs can be fully utilized. The controller calculates power rates to help packs balancing SOC.

Another advantage is to plug and play. The system 100 does not require all packs have same characteristics. Different type of battery packs old and new, different brands, original and restack can be used in the system 100. This is not possible in any existing energy storage system. In addition, the system 100 can be operated partially even if some part of system is down. The broken part can be easily insolated without pulling the whole system down.

The present disclosure provides a method for operating an electrical energy storage system 100 as described through a controller 60 therein, or a method of using the controller 60 as described.

Referring to FIGS. 6A-6B, an exemplary method 300 for controlling discharge or charge of the battery packs is illustrated in accordance with some embodiments. The steps described herein are also the steps the controller 60 is configured to perform through the programs.

Before and during the operation of the system 100, general procedures may include the following steps. The plurality of battery packs such as second-use electric vehicle (EV) batteries are connected in parallel as described in the system. One battery pack 20 is configured to be connected to one power converter 10 or a DC port on a converter 10 through two circuit breakers. The circuit breakers are motorized and connected to the MIST through function relays. One or more converters 10 connected in parallel are connected to the grid. One or more BPMUs 30 are used to activate internal battery BMU 25 and interpret the battery data and transmit to MIST. All components of the system, including HMI, converters 10, BPMUs 30, and protection relays, are linked to the MIST controller 60 through TCP/IP network. The MIST controller 60 collects data and receives orders from HMI or an upper level energy management system (EMS), then makes calculation based on conditions of battery packs and total power requirement. The MIST controller sends out commands to operate battery converters, and monitors and controls the entire system. The MIST controller 60 revises power rate for battery packs when the SOH, the SOCs, and the battery pack voltages reach to given threshold values. The MIST controller 60 logs all system data and tracks error information At step 302 of FIG. 6A, the data including state of health (SOH) and state of charge (SOC) is obtained and read from each of the plurality of battery packs 20, which are connected in parallel. In some embodiments, the controller 60 can be used to read these data directly from battery packs 20 or through one or more battery power management unit (BPMU) 30 for monitoring and controlling the plurality of battery packs.

At step 304, a respective battery pack 20 is connected with a respective power converter 10. As described above, a battery pack 20 can be connected to one power converter 10 or a DC port on a converter 10 through two circuit breakers. The circuit breakers are motorized and connected to the controller 60 through function relays.

At step 306, a power command is received from an upper level energy management system (EMS) 110.

At step 308, a respective power rate of each battery pack is calculated based on the SOH and the SOC of each battery pack 20 and the power command from the EMS 110.

At step 310, power is discharged from the plurality of battery packs to a grid, or power from the grid is charged to the plurality of battery packs based on the power rate of each battery pack. The charging or discharging is based on the demand from the EMS 110. Each power converter 10 is coupled with at least one battery pack 20 and can convert DC from a respective battery pack 20 to AC during a discharging process, or vice versa during a charging process. The controller 60 is configured to discharge power from the plurality of battery packs 20 in DC to a grid in AC, or charge power from the grid to the plurality of battery packs.

In some embodiments, the controller is configured to calculate a respective power rate ($P_i$) of each battery pack according to equations (1) and (2):

$$a_i = 100\% * \begin{cases} \dfrac{SOH_i(1-SOC_i)}{\sum_i SOH_i(1-SOC_i)}, \text{Charge} \\ \dfrac{SOH_i * SOC_i}{\sum_i SOH_i * SOC_i}, \text{Discharge} \end{cases} \text{ and,} \quad (1)$$

$$P_i = \min(P_{iMax}, P_T * a_i), \quad (2)$$

wherein $SOH_i$ and $SOC_i$ are the SOH and the SOC of each battery pack, respectively, $P_T$ is the power command from the EMS, $P_{iMax}$ is the maximum capacity of each battery pack, and $a_1$ is a multiplier (in percentage) representing a dispatch share (or rate) of each battery pack. The subscript "i" represents the number of each respective battery pack in the plurality of battery packs. The respective power rate ($P_i$) of each battery pack is the minimum (or the smaller value) of the two values including $P_{iMax}$ and $P_T*a_i$.

Equation (1) above include two separate equations including 1(a) for charging and 1(b) for discharging:

$$a_i = 100\% * \frac{SOH_i(1-SOC_i)}{\sum_i SOH_i(1-SOC_i)}, \text{Charge, and} \quad (1a)$$

$$a_i = 100\% * \frac{SOH_i * SOC_i}{\sum_i SOH_i * SOC_i}, \text{Discharge.} \quad (1b)$$

In addition to the steps above, the controller 60 is also configured to perform other steps, for example, steps 312, 314, and 316 shown in FIG. 6B.

At step 312, signals with instruction are sent to each converter and/or each battery pack for discharging or charging based on the respective power rate of each battery pack.

At step 314, alternatively, feedback is sent to the EMS if the power command is over a maximum limit of the system.

At step 316, the BMU 25 and the inverter 40 of each battery pack 20 are monitored and the data are read from them. Step 316 can be overlapped with step 302. The method then cycles back to step 302 of FIG. 6A.

One important function of the MIST controller 60 is to dispatch power from battery packs during discharging or dispatch power into battery packs during charging. Due to variety of first life, the SOC and SOH of second-use battery packs are different in the system 100. Charge/discharge power must be divided according to the condition of packs. This dispatch power rate is proportional to the energy stored in the packs. Equation (1) is used to calculate the dispatch rate for the $i^{th}$ pack. Then the power is calculated using equation (2) and subject to the power limit.

Referring to FIG. 7, an exemplary flow chart 400 illustrates the steps and algorithm used in some embodiments. Each block represents a step or a criterion. At block 92, the system is started. At block 94, the controller 60 communicates with BMUs 25 and inverters 40 in the battery packs 20 to check the conditions and read data of BMUs 25 and inverters 40 at block 96. At block 98, if the communication fails with one battery pack 20, the controller 60 will list such BMUs 25 and/or inverters 40 at fault and check the next battery pack. If a communication with one battery pack does not fail, the controller 60 reads the voltage of battery pack 20 at block 102. At block 104, a DC voltage is pumped up on the inverter 40 to close the circuit breaker between the battery pack 20 and the port of the respective power converter 10 so that such battery pack 20 and the respective power converter 10 are connected together. These are the procedures preparing the system to perform the steps for discharging or charging.

At block 106, the power command is read from upper level energy management system (EMS) 110. At block 108, the SOC and SOH of each battery pack are checked, and the power rate for each battery pack is calculated as described above, for example, using equations (1) and (2). The power are planned to be distributed accordingly. At block 112, the power limits of the battery packs 20 are checked. If the power demand of a battery pack 20 is over its limit, at block 114, such a battery pack is restricted for distributing power, and power rates of other battery packs are then recalculated by going back to blocks 106 and 108. If the power demand of a battery pack 20 is within its limit (i.e., no violation of its power limit) at block 112, at block 118, a check is performed to see whether the total power demand is over the limit of the system 100. If the total power from the battery packs cannot meet the requirement of the power command from the EMS 110, at block 120 a feedback is sent to the EMS 110 and a new and less power command is requested. If the total power from the battery packs can meet the requirement of the power command from the EMS 110, command and instructions are sent to the battery packs 20 including the inverters 40. The steps from block 106 to block 122 of FIG. 7 can be repeated with cycles before the end at block 124.

As described above, the present disclosure provides the controller 60 for an electrical energy storage system.

In some embodiments, the MIST controller 60 is a location controller of the system. It oversees the system as a brain. The controller 60 checks communications with all hardware components, collect data, and display error if there is any. The controller 60 operates converters and circuit breakers to line battery packs onto converter DC ports. It also receives commands from HMI or upper level EMS. The controller 60 computes power rate for individual battery packs and assigns the power rates to converters for charge/discharge actions. The controller 60 monitors the status and conditions of each battery pack, and re-estimates power rate accordingly. The controller 60 logs data in local and/or cloud database. The controller 60 monitors the data including SOH, SOC, and voltage values on each battery pack and decides the new power rates in real time. The MIST controller also operates circuit breakers between battery packs and converters to avoid over charge/discharge.

EXAMPLES

For illustration only, the system 200 of FIG. 3 is used for evaluation. In the following examples, a power demand is 24 KW, and a constant dispatch is used.

Figure 8:
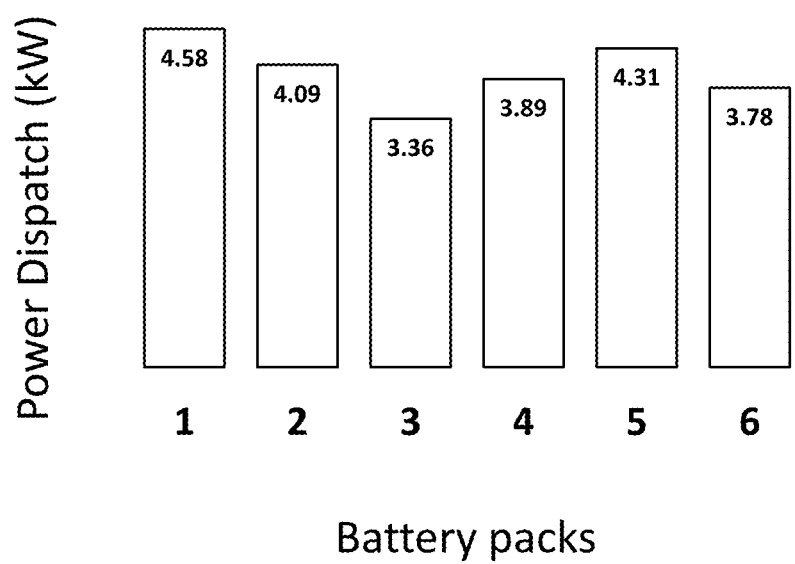
FIG. 8 shows an example of discharging using the six battery packs in the system of FIG. 3.

FIG. 8 and Table 1 show an example of discharging using the six battery packs in the system 200 of FIG. 3.

TABLE 1

| PACK # | SOH % | SOC % | SOH(SOC) | SOH(1-SOC) | $P_{i,\,max}$ | $P_T * a_i$ | P |
|---|---|---|---|---|---|---|---|
| 1 | 65.0% | 90.0% | 58.5% | 6.5% | 8 | 4.58 | 4.58 kW |
| 2 | 67.0% | 78.0% | 52.3% | 14.7% | 8 | 4.09 | 4.09 kW |

TABLE 1-continued

| PACK # | SOH % | SOC % | SOH(SOC) | SOH(1-SOC) | $P_{i,max}$ | $P_T * a_i$ | P |
|---|---|---|---|---|---|---|---|
| 3 | 66.0% | 65.0% | 42.9% | 23.1% | 8 | 3.36 | 3.36 kW |
| 4 | 63.0% | 79.0% | 49.8% | 13.2% | 8 | 3.89 | 3.89 kW |
| 5 | 68.0% | 81.0% | 55.1% | 12.9% | 8 | 4.31 | 4.31 kW |
| 6 | 69.0% | 70.0% | 48.3% | 20.7% | 8 | 3.78 | 3.78 kW |
|   |   |   | Σ 3.0681 | Σ 0.9119 |   | Σ 24 | Σ 24 |

Figure 9:
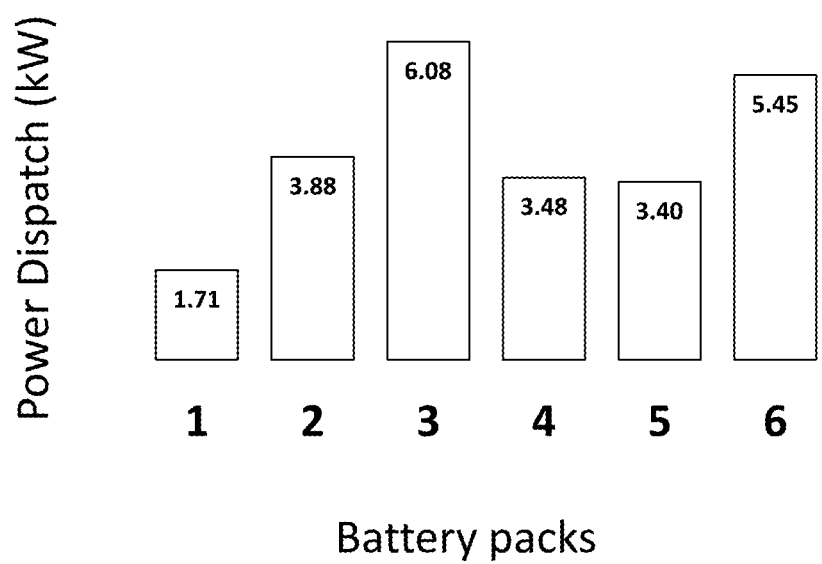
FIG. 9 shows an example of charging using the six battery packs in the system of FIG. 3.

FIG. 9 and Table 2 show an example of charging using the six battery packs in the system of FIG. 3.

TABLE 2

| PACK # | SOH % | SOC % | SOH(SOC) | SOH(1-SOC) | $P_{i,max}$ | $P_T * a_i$ | P |
|---|---|---|---|---|---|---|---|
| 1 | 65.0% | 90.0% | 58.5% | 6.5% | 8 | 1.71 | 1.71 KW |
| 2 | 67.0% | 78.0% | 52.3% | 14.7% | 8 | 3.88 | 3.88 kW |
| 3 | 66.0% | 65.0% | 42.9% | 23.1% | 8 | 6.08 | 6.08 kW |
| 4 | 63.0% | 79.0% | 49.8% | 13.2% | 8 | 3.48 | 3.48 kW |
| 5 | 68.0% | 81.0% | 55.1% | 12.9% | 8 | 3.40 | 3.40 kW |
| 6 | 69.0% | 70.0% | 48.3% | 20.7% | 8 | 5.45 | 5.45 kW |
|   |   |   | Σ 3.0681 | Σ 0.9119 |   | Σ 24 | Σ 24 |

The system, the controller, and the method provided in the present disclosure offer many advantages. For example, the system is a decentralized design. A variety of battery packs such as used EV battery packs having different quality can be used. No pre-selection or dismantle of the battery packs are needed. If one pack and/or one converter fails to response, the system still has capability to supply power load to satisfy the power demand. The system, the controller, and the method extend the life of each battery packs, and they also offer flexibility in maintaining and upgrading the system as well.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing the method. The methods may also be at least partially embodied in the form of a computer into which computer program code is loaded and/or executed, such that, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods. The computer or the control unit may be operated remotely using a cloud based system.

Although the subject matter has been described in terms of exemplary embodiments, it is not limited thereto. Rather, the appended claims should be construed broadly, to include other variants and embodiments, which may be made by those skilled in the art.

What is claimed is:

1. An electrical energy storage system, comprising:
a plurality of battery packs connected in parallel;
one or more battery power management unit (BPMU), each BPMU connected with one or more battery packs and configured to monitor and control the one or more battery packs;
one or more power converters, each power converter coupled with at least one battery pack and configured to convert direct current (DC) from the at least one battery pack to alternating current (AC) or vice versa; and
a controller using multi-source inputs smart technology (MIST) and comprising one or more processor and at least one tangible, non-transitory machine readable medium encoded with one or more programs configured to perform steps of:
reading data including state of health (SOH) and state of charge (SOC) from each battery pack;
connecting a respective battery pack with a respective power converter;
receiving a power command from an upper level energy management system (EMS);
calculating a respective power rate of each battery pack based on the SOH and the SOC of each battery pack and the power command from the EMS; and
discharging power from or charging power to the plurality of battery packs based on the power rate of each battery pack,
wherein the controller is configured to calculate the respective power rate ($P_r$) of each battery pack according to equations (1) and (2):

$$a_i = 100\% * \begin{cases} \frac{SOH_i(1-SOC_i)}{\sum_i SOH_i(1-SOC_i)}, \text{Charge} \\ \frac{SOH_i * SOC_i}{\sum_i SOH_i * SOC_i}, \text{Discharge} \end{cases} \text{and,} \quad (1)$$

$$P_i = \min(P_{iMax}, P_T * a_i), \quad (2)$$

wherein SOH and SOC are the SOH and the SOC of each battery pack, respectively, $P_T$ is the power command from the EMS, $P_{imax}$ is the maximum capacity of each battery pack, and $a_i$ is a multiplier representing a dispatch share of each battery pack.

2. The system of claim 1, wherein the plurality of battery packs are heterogeneous battery packs selected from new batteries, second-use electric vehicle (EV) batteries, or combinations thereof.

3. The system of claim 1, wherein each battery pack comprises an inverter and an internal battery management unit (BMU).

4. The system of claim 3, wherein the controller is configured to read the data from and monitor the inverter and the BMU of each battery pack.

5. The system of claim 1, further comprising a plurality automatic circuit breakers, each circuit breaker configured to connect or disconnect a respective battery pack and a respective power converter.

6. The system of claim 1, wherein the controller is configured to discharge power from the plurality of battery packs to a grid, or charge power from the grid to the plurality of battery packs.

7. The system of claim 1, wherein the controller is configured to send signals with instruction to each converter and/or each battery pack for discharging or charging based on the respective power rate of each battery pack.

8. The system of claim 1, wherein the controller is configured to send feedback to the EMS if the power command is over a maximum limit of the system.

9. A controller for an electrical energy storage system, using multi-source inputs smart technology (MIST) and comprising one or more processor and at least one tangible, non-transitory machine readable medium encoded with one or more programs configured to perform steps of:
reading data including state of health (SOH) and state of charge (SOC) from each of a plurality of battery packs connected in parallel, through one or more battery power management unit (BPMU) for monitoring and controlling the plurality of battery packs;
connecting a respective battery pack with a respective power converter, which is coupled with at least one battery pack and configured to convert direct current (DC) from a respective battery pack to alternating current (AC) or vice versa;
receiving a power command from an upper level energy management system (EMS);
calculating a respective power rate of each battery pack based on the SOH and the SOC of each battery pack and the power command from the EMS; and
discharging power from or charging power to the plurality of battery packs based on the power rate of each battery pack,
wherein the controller is configured to calculate a respective power rate ($P_r$) of each battery pack according to equations (1) and (2):

$$a_i = 100\% * \begin{cases} \frac{SOH_i(1-SOC_i)}{\sum_i SOH_i(1-SOC_i)}, \text{Charge} \\ \frac{SOH_i * SOC_i}{\sum_i SOH_i * SOC_i}, \text{Discharge} \end{cases} \text{ and,} \quad (1)$$

$$P_i = \min(P_{iMax}, P_T * a_i), \quad (2)$$

wherein $SOH_i$ and $SOC_i$ are the SOH and the SOC of each battery pack, respectively, $P_T$ is the power command from the EMS, $P_{imax}$ is the maximum capacity of each battery pack, and $a_i$ is a multiplier representing a dispatch share of each battery pack.

10. The controller of claim 9, wherein the plurality of battery packs are heterogeneous battery packs selected from new batteries, second-use electric vehicle (EV) batteries, or combinations thereof.

11. The controller of claim 9, wherein the controller is configured to discharge power from the plurality of battery packs to a grid or load, or charge power from the grid to the plurality of battery packs.

12. The controller of claim 9, wherein the controller is configured to send signals with instruction to each converter and/or each battery pack for discharging or charging based on the respective power rate of each battery pack.

13. The controller of claim 9, wherein the controller is configured to send feedback to the EMS if the power command is over a maximum limit of the system.

14. A method for operating an electrical energy storage system through a controller therein, comprising:
reading data including state of health (SOH) and state of charge (SOC) from each of a plurality of battery packs connected in parallel;
connecting a respective battery pack with a respective power converter, which is coupled with at least one battery pack and configured to convert direct current (DC) from a respective battery pack to alternating current (AC) or vice versa;
receiving a power command from an upper level energy management system (EMS);
calculating a respective power rate of each battery pack based on the SOH and the SOC of each battery pack and the power command from the EMS; and
discharging power from the plurality of battery packs to a grid or charging power from the grid to the plurality of battery packs based on the power rate of each battery pack,
wherein the respective power rate of each battery pack is calculated according to equations (1) and (2):

$$a_i = 100\% * \begin{cases} \frac{SOH_i(1-SOC_i)}{\sum_i SOH_i(1-SOC_i)}, \text{Charge} \\ \frac{SOH_i * SOC_i}{\sum_i SOH_i * SOC_i}, \text{Discharge} \end{cases} \text{ and,} \quad (1)$$

$$P_i = \min(P_{iMax}, P_T * a_i), \quad (2)$$

wherein SOH and SOC are the SOH and the SOC of each battery pack, respectively, $P_T$ is the power command from the EMS, $P_{imax}$ is the maximum capacity of each battery pack, $a_i$ is a multiplier representing a dispatch share of each battery pack, and $P_i$ is the respective power rate of each battery pack.

15. The method of claim 14, wherein the plurality of battery packs are heterogeneous battery packs selected from new batteries, second-use electric vehicle (EV) batteries, or combinations thereof.

16. The method of claim 14, further comprising sending instructions from the controller to each converter and/or each battery pack for discharging or charging based on the respective power rate of each battery pack.

17. The method of claim 14, further comprising sending feedback from the controller to the EMS if the power command is over a maximum limit of the system.

* * * * *